Aug. 12, 1941.     L. F. RASHA     2,252,643
MILK STRAINER
Filed July 24, 1939

Leo F. Rasha  INVENTOR
BY Victor J. Evans & Co.

WITNESS     ATTORNEYS

Patented Aug. 12, 1941

2,252,643

UNITED STATES PATENT OFFICE 2,252,643

MILK STRAINER

Leo F. Rasha, Taberg, N. Y.

Application July 24, 1939, Serial No. 286,249

2 Claims. (Cl. 210—156)

This invention relates to milk strainers and has for its principal object to produce a device of its character by the use of which the milk is quickly strained and cleared of detrimental foreign particles and germ laden dirt before the milk is run into the producer's station cans for delivery to the distributor, thereby cutting down the bacteria count.

A particular object is to simplify the construction and arrangement of the device so that the parts thereof may be quickly assembled and taken apart and facilitating the cleansing and maintenance of the device in a sanitary condition.

With the foregoing and other objects and advantages to be attained, the invention consists in the novel general structure and in the parts and combinations and arrangements of parts thereof as hereinafter described and claimed, reference being had to the accompanying drawing illustrating a practical adaptation of the invention, in which—

Figure 1:
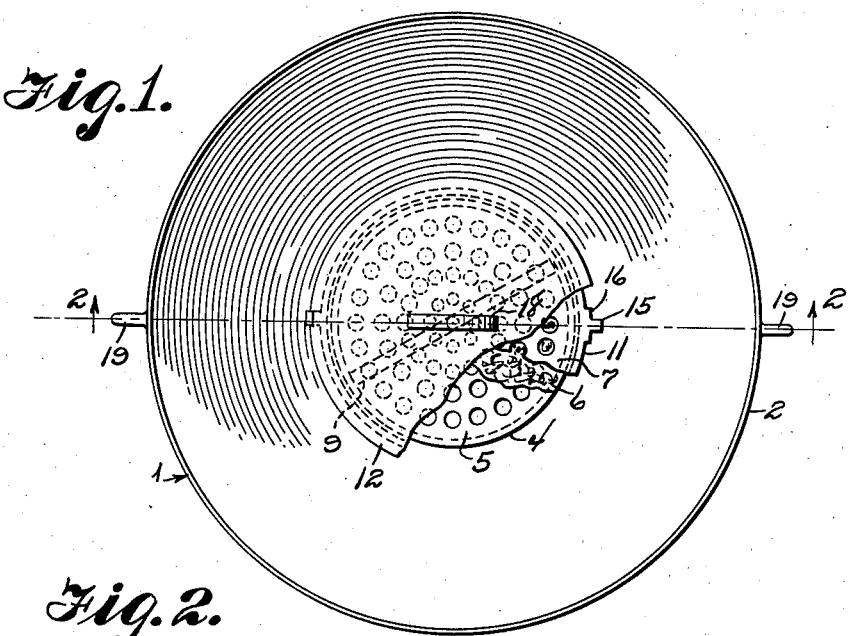
Figure 1 is a top plan view with parts broken away to illustrate details of the structure.

Referring now to the drawing the numeral 1 designates the receptacle body of the strainer, the upper portion 2 of which is cylindrical and open at the top, the lower portion 3 being tapered or funnel-shaped. The lower portion 3 of the receptacle body 1 is, in effect, a truncated hollow inverted cone, in the opening of which a hollow cylindrical member 4 is secured with a leaktight fitting, the upper end of said member being closed by a perforated end wall 5 and projected some distance upwardly into the tapered lower portion of the receptacle body and constituting a raised bottom for the receptacle. The lower portion of the cylindrical member 4, which is open-ended, projects some distance below the tapered lower portion 3 of the receptacle 1 and constitutes a spout which is insertable in the mouth of a can or other receptacle into which the strained milk is delivered, as will later more fully appear.

On the perforated end wall 5 of the member 4 is placed a conventional filter disk 6 of woven or felted fabric which is enclosed and held in place by a perforated cover plate 7 having a cylindrical flange 8 which is detachably fitted over the upper end portion of the member 4 constituting the raised bottom of the receptacle 1, said plate 7 having an arched handle 9 extended to a considerable elevation above the plate.

The annular space in the immediate region between the upper end portion of the cylindrical member 4 and the adjoining tapered portion 3 of the receptacle body constitutes a sediment trap 10 which is overhung by an annularly flanged baffle extension 11 of the filter disk cover plate 7, said baffle extension carrying thereon a flow-controlling cone 12 in annularly spaced relation thereto, as at 13, the lower marginal portion of the cone being spaced a slight distance from the adjacent surrounding tapered portion 3 of the receptacle body 1 and affording a restricted annular passageway 14 therebetween.

As shown, the mounting of the cone 12 on the baffle extension 11 of the plate 7 and the annular spacing 13 therebetween is accomplished by providing the baffle extension, at diametrically opposite points on the periphery thereof, with lugs 15 having stepped base portions 16 for the engagement of bayonet-slotted portions 17 provided in the corresponding marginal portions of the cone 12, the stepped portions 16 of the lugs 15 serving as spacing elements to maintain the concentricity of the annular space 13 between the periphery of the baffle extension 11 and adjacent wall portion of the cone. By this provision the cone 12 is readily positioned and secured on the baffle extension 11 and removed therefrom, at will, and to facilitate the placing and removal of the cone it is provided with an elongated looped handle 18 which is preferably of a length to extend some distance above the top of the receptacle body 1 as shown in Figure 2 of the drawing.

The receptacle body 1 is also provided with handles 19 on the outer side of its upper cylindrical wall portion 2 so that the strainer may be carried about and handled in use without placing the hands of the user within the receptacle. This outside arrangement of the handles 19 and the elongated handle 18 on the cone 12 and the raised handle 9 on the filter cover plate 7 is an important feature of the present invention in that the hands of the user do not touch the portions of the device with which the milk comes in contact in the use thereof.

Figure 2:
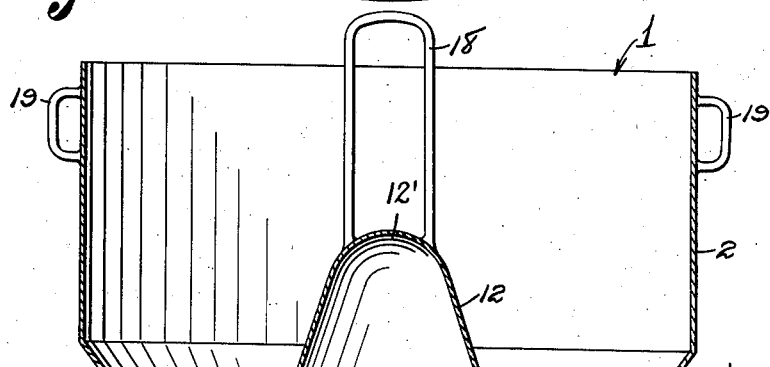
Figure 2 is a vertical section taken on or about the line 2—2 of Figure 1.
Figures 3, 4:
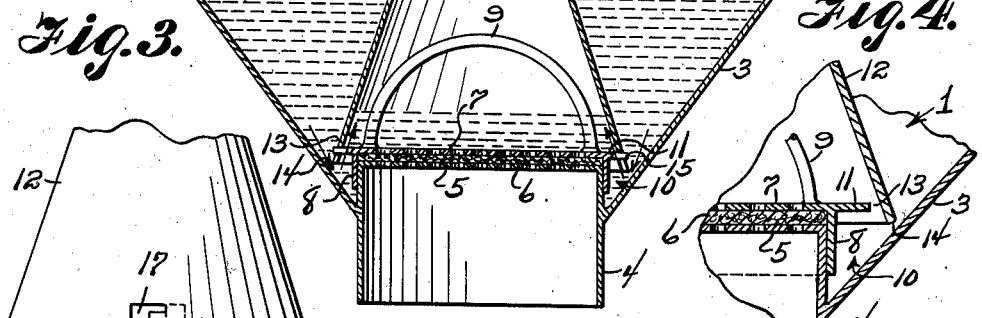
Figure 3 is a fragmentary view, in side elevation, of the base portion of the flow-controlling cone.
Figure 4 is a fragmentary sectional view, on an enlarged scale, illustrating the relative arrangement of the sediment trap baffle and passageways to and from the trap.

In the use of the strainer with the parts assembled as shown in Figure 2, the milk to be strained is run into the receptacle body 1, thereby creating a hydrostatic head which forces the milk through the restricted annular passageway 14 into the sediment trap 10, whence it flows upwardly through the restricted annular passageway 13 into the lower portion of the hollow cone 12 and to a limited depth over the top of the filter cover plate 7, it being here noted that in practical use and with a strainer device of the average size and capacity the width of the openings 13 and 14 will be approximately one-sixteenth of an inch and the depth of the liquid on the filter cover plate 7 will be approximately one inch, this depth, of course, varying somewhat as the hydrostatic head changes in the receptacle body 1.

By the provision of the flow-controlling cone 12 with the restricted annular passageways 13 and 14 there is a smooth and even flow of the milk from the receptacle body 1 to and through the filter element 6 without any surging and overwashing effect and at the same time foreign particles in the milk are precipitated into the trap 10 due to the overhanging baffle extension 11 of the filter cover plate 7 and the directional change in the flow of the milk as it passes through the trap 10 downwardly from the restricted annular passageway 14 between the lower marginal portion of the cone 12 and the tapered portion 3 of the receptacle body 1 and thence upwardly to the passageway 13 between the periphery of the baffle extension 11 and adjacent wall portion of the cone 12, and there being a reactive effect of the air which is trapped in the cone 12 above the liquid which flows over the top of the filter cover plate 7, the air within the cone 12 being obviously placed under compression due to the hydrostatic pressure of the liquid in the receptacle body 1 outside the cone.

In addition to the air compression and cushioning effect produced in the cone 12 above the stratum of milk on the filter cover plate 7, as just above described, a siphon effect is also produced in the immediate region of the stratum of milk as the milk flows out through the perforated cover plate 7, filtering disk 6 and perforated head 5 of the cylindrical spout member 4, tending to create a partial vacuum, thereby drawing the milk through the annular passageway 13 and across the plate 7 in a smooth and even flow from the entire periphery of the plate so that the milk is quickly strained and filtered before it enters the spout 4 and is discharged into the station can or container to be delivered to the distributor. There is a further material advantage in the provision of the vertically elongated flow-controlling cone 12, the apex portion of which is preferably rounded, as at 12', in that the milk may be poured into the receptacle body 1 without splashing over the side of the receptacle as well as preventing the milk from coming in contact with the filter cover plate 7 until it has passed in its regular course through the annular passageway 14, sediment trap 10 and annular passageway 13 as hereinbefore described.

From the foregoing it is apparent that a practical and efficient milk strainer is produced not only through which the milk is quickly passed and effectively filtered but is handled in use as well as in assembling the device and taking it apart without the hands of the user touching the parts with which the milk comes in contact, because of the character and arrangement of the respective handles 9, 18 and 19, and at the same time the separate parts of the device are readily cleansed and maintained in a sanitary condition.

While the structure illustrated in the drawing embodies a practical adaptation of the invention, it is obvious that considerable modification may be made therein without departing from the spirit and scope of the invention as defined by the appended claims. The invention is, therefore, not limited to the specific construction and arrangement shown.

What is claimed is:

1. The herein described milk strainer, comprising a main receptacle body having a cylindrical upper portion open at its top and a hollow truncated inverted conical bottom proper, a cylindrical spout member secured with leaktight fitting in the opening produced by the truncation of the bottom proper of the receptacle, the upper end of the spout member being closed by a perforated end wall and projected upwardly into the receptacle to provide a raised filtering bottom, the lower end of said spout member being open, a filter element superimposed upon said filtering bottom, a perforated filter cover plate superimposed upon said filtering element and provided with an annular enclosing flange fitted detachably on said raised filtering bottom of the receptacle, an annular baffle flange on said filter cover plate, said baffle flange having peripheral extensions, and a hollow flow-controlling cone disposed above said filter cover plate and having provision adjacent its lower marginal portion for detachable interfitting engagement with the peripheral extensions of said baffle flange of the filter cover plate whereby the cone is supported on said baffle flange with a restricted annular space between the periphery of the flange and the adjacent wall portion of the cone, the edge of the cone being in restricted spaced annular relation to the adjacent wall portion of the inverted conical bottom proper of the receptacle.

2. The herein described milk strainer, comprising a main receptacle body open at its top and having a hollow truncated inverted conical bottom proper, said body having external handles on the upper portion thereof, a cylindrical spout member secured in the opening of the bottom proper with leaktight fitting, the upper end of the spout member being closed by perforated wall and projected upwardly into the receptacle to constitute a raised filtering bottom, the lower end of the member being open, a filter disk superimposed upon said end wall of the spout, a flat perforated platelike cover superimposed on said filter disk and having an annular enclosing flange fitted detachably on the upper end portion of said spout member, said filter cover having an annular overhanging baffle flange provided with peripheral projections, said cover being also provided with a raised looped handle, and a hollow flow-controlling cone disposed above said filter cover and having bayonet slots in its lower marginal portion for detachable engagement with the peripheral projections of said baffle flange of the filter cover whereby to support the cone on said baffle flange in restricted spaced annular relation to the periphery of the flange, the edge of the cone being in restricted spaced annular relation to the adjacent wall portion of the inverted conical bottom proper of the receptacle, and an elongated upstanding looped handle on the apex portion of said flow-controlling cone.

LEO F. RASHA.